United States Patent [19]

Erickson

[11] Patent Number: 4,688,257

[45] Date of Patent: Aug. 18, 1987

[54] SECURE WIRELESS COMMUNICATION SYSTEM UTILIZING LOCALLY SYNCHRONIZED NOISE SIGNALS

[75] Inventor: Bert K. Erickson, Fayetteville, N.Y.

[73] Assignee: General Electric Company, Bridgeport, Conn.

[21] Appl. No.: 631,839

[22] Filed: Jul. 17, 1984

[51] Int. Cl.[4] .......... H04L 9/00

[52] U.S. Cl. .......... 380/48; 380/59

[58] Field of Search .......... 455/30, 9; 179/1.5 R, 179/1.5 M; 178/22.15, 22.17; 364/717; 375/108, 109, 114, 113

[56] References Cited

U.S. PATENT DOCUMENTS

| | | | |
|---|---|---|---|
| 3,341,659 | 9/1967 | Stern | 179/1.5 |
| 3,381,223 | 4/1968 | Nakamura et al. | 455/30 |
| 3,624,297 | 11/1971 | Chapman et al. | 179/1.5 |
| 3,694,757 | 9/1972 | Hanna, Jr. | 325/466 |
| 3,781,473 | 12/1973 | Goode et al. | 178/22.15 |
| 3,909,534 | 9/1975 | Majeau et al. | 179/1.5 R |
| 3,942,115 | 3/1976 | Wolejsza, Jr. | 455/9 |
| 4,099,027 | 7/1978 | Whitten | 179/1.55 |
| 4,126,761 | 11/1978 | Graupe et al. | 455/30 |
| 4,171,513 | 10/1979 | Otey et al. | 325/32 |
| 4,172,963 | 10/1979 | Belcher et al. | 179/1.5 R |
| 4,176,399 | 11/1979 | Hoffmann et al. | 364/717 |
| 4,206,462 | 6/1980 | Rabow et al. | 343/7.6 |
| 4,221,931 | 9/1980 | Seiler | 179/1.5 R |
| 4,231,113 | 10/1980 | Blasbalg | 179/1.5 R |
| 4,231,114 | 10/1980 | Dolikian | 455/49 |
| 4,319,358 | 3/1982 | Sepp | 375/1 |
| 4,341,925 | 7/1982 | Doland | 178/22.17 |
| 4,361,729 | 11/1982 | Barnes, Jr. et al. | 455/30 |
| 4,397,034 | 8/1983 | Cox et al. | 455/30 |
| 4,411,017 | 10/1983 | Talbot | 179/1.5 R |

*Primary Examiner*—Salvatore Cangialosi
*Assistant Examiner*—Aaron J. Lewis
*Attorney, Agent, or Firm*—George R. Powers

[57] ABSTRACT

Apparatus and method are disclosed for synchronziing the operation of the frequency sensitive devices of two or more transceiver units in a secure, wireless communication system. A fixed frequency pilot signal is generated in a first unit of the system and transmitted to the other units. The encoding noise signal locally generated in each unit is timed by clock pulses derived from the locally available pilot signal. If synchronism between the respective noise signals is lost, the pilot signal is disabled. This causes a reset pulse to be generated in each unit. The action resets each noise generator and restores synchronous operation.

7 Claims, 5 Drawing Figures

SECURE WIRELESS COMMUNICATION SYSTEM UTILIZING LOCALLY SYNCHRONIZED NOISE SIGNALS

BACKGROUND OF THE INVENTION

1. Field of the Invention

The present invention relates in general to a secure, wireless communication system utilizing synchronized noise signals for coding and decoding message signals and, more particularly, to a communication system in which the noise signals are locally synchronized on a substantially continuous basis to assure accurate and reliable transmission of information between transceiver units of the system.

2. Description of the Prior Art

In the art of secure communications, particularly in systems which use a plurality of transceiver units wirelessly linked to one another, it is known to use signals having the same predetermined known pattern to both encode and decode the message signal at the transmitting and receiving transceivers. Although the encoding and decoding signals have specific known patterns, they are referred to as noise signals since they appear, in the absence of the required decoding key, to be noise. For proper operation, the noise generating circuits of the respective transceiver units must be synchronized with each other such that the noise signal used to encode a message signal within one transceiver before transmission can be readily stripped within another transceiver after reception. Many of these known systems require transmission of initialization or reset pulses to each transceiver unit in order to synchronize the encoding and decoding noise signals, i.e. the reset pulses must be modulated, amplified and coverted to the proper form for wireless transmission. To be received, the transmitted pulses must be collected by an antenna and thereafter detected or demodulated and amplified. During operation, the encoding and decoding noise signals in the various transceivers of the communication system may lose their synchronization due to drift or other factors. Typically, prior art communication systems will continue with the noise encoding of the message signal during the time that the encoding and decoding noise signals are not in synchronism. As a result, the noise signal cannot be properly stripped by the receiving transceiver, and the message signal may be garbled or lost entirely. Reset pulses may be transmitted on a periodic basis during operation to minimize the period during which synchronization can be lost. If, however, there is even a slight error in the transmission or reception of the reset pulses, resynchronization will not be attained, and the system will continue to operate with the respective noise generators out of synchronism with one another. As a consequence, the message signal will be unintelligible at the receiving transceiver and the communication system will not provide an acceptable level of reliability.

SUMMARY OF THE INVENTION

It is a primary object of the present invention to provide a new and improved secure, wireless communication system which is not subject to the foregoing disadvantages.

It is an additional object of the present invention to provide a new and improved secure, wireless communication system with the reliability required for use in commercial applications.

It is another object of the present invention to provide a new and improved secure, wireless communication system wherein there is no need to transmit discrete reset pulses between tranceiver units to maintain synchronization of noise encoding and decoding signals.

It is a further object of the present invention to provide a new and improved, secure, wireless communication system which uses noise encoding and which effectively compensates for drift occurring during message transmission or reception.

The communication system which forms the subject matter of the present invention comprises a plurality of transceiver units, each including a noise generator for encoding and decoding a transmitted and received message signal, respectively. A synchronization circuit is provided for each transceiver for synchronizing the digital pulse sequence generated by the respective noise generator such that the local decoding noise signal is synchronized with the received encoding noise signal. A fixed frequency pilot signal is generated in a first unit and is transmitted to the other units. The synchronization circuit in each unit derives clock pulses from the locally available pilot signal, the clock pulses being used to clock the noise generator of that unit.

Upon detection of an unsynchronized condition between the encoding the decoding noise signals in one of the transceiver units, the pilot signal in the first unit is disabled and thereby becomes unavailable in any unit of the system. Each synchronization circuit of the system responds by locally generating reset pulses, which reset the corresponding noise generator to its initial state. The noise generators of the respective units are substantially identical. All are arranged to have the same predetermined initial state, and they therefore generate identical noise signals. Thereafter, the pilot signal is again enabled and the respective noise generators resume the generation of noise signals in a synchronized manner.

The invention itself, as well as the objects thereof, together with the features nd advantages, will become apparent from the following detailed specification, when read together with the accompanying drawings in which applicable reference numerals have been carried forward.

DETAILED DESCRIPTION OF THE PREFERRRED EMBODIMENT

Figure 1:
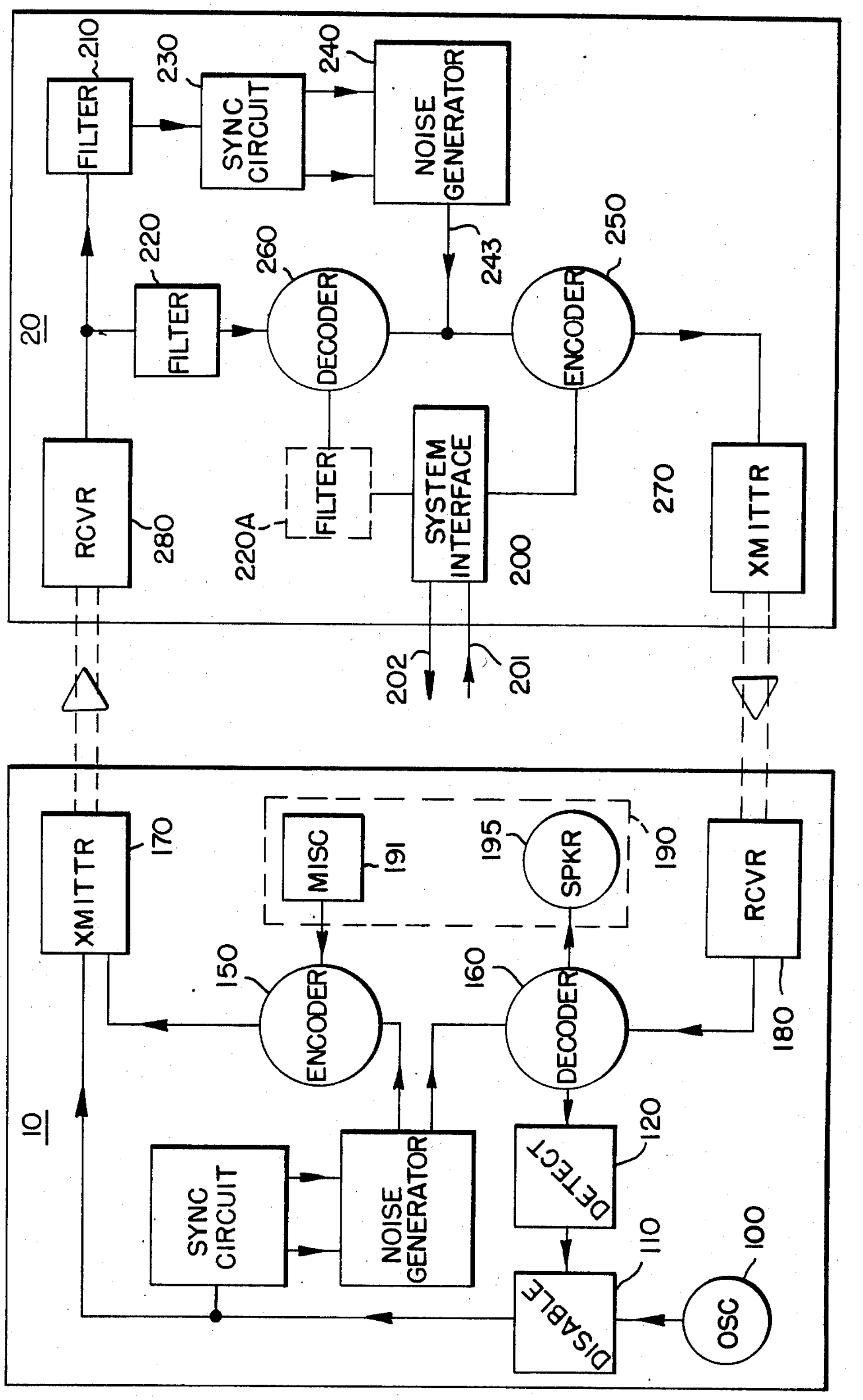
FIG. 1 is a block diagram of an examplary secure, wireless communication system in accordance with the present invention.

FIG. 1 is a block diagram of a preferred embodiment of the invention illustrated in the context of a wireless telephone communication system which uses a pair of transceiver units, a handset 10 and a base station 20. The invention is not limited to a pair of transceivers; it is likewise applicable where a single base station may communicate on a selective basis with more than one handset. For example, a number of field units (handsets)

may communicate on an individual basis with a single base station.

Handset 10 includes an oscillator 100, designed to generate a pilot signal at a substantially fixed frequency, which is chosen to be 6 KHz in the preferred implementation. Such oscillators are well known in the art and may comprise one of several commercially available packages. The output of oscillator 100 is connected to a circuit 110, which will hereafter be referred to as a disabling circuit or disabler. The disabling circuit 110 normally permits the pilot signal generated by the oscillator 100 to be delivered to both transmitter 170 and a synchronizing cuicuit 130. When, however, the noise generators of the transceivers are not in proper synchronization, the disabling circuit 110 prevents delivery of the pilot signal to both the transmitter 170 and the synchronizing circuit 130. While in the preferred embodiment, disabler 110 is shown as a discrete component, it will be understood that other apparatus for disabling the pilot signal may be used, e.g. switch integrally connected with oscillator 100 for turning the oscillator on and off. As used herein, the term transmitter includes all the apparatus and steps required for converting an electrical message signal to electromagnetic energy for wireless transmission. While the present invention is discussed in the context of a frequency modulation transmitter adapted to transmit the message signal at a preferred frequency of 49 MHz, any well known method of radiowave transmission may be employed, e.g. amplitude or pulse modulation.

Synchronization circuit 130 has a pair of outputs, each coupled to a corresponding input of a noise generator 140, which is a shift register for producing an output waveform (noise signal) having a predetermined format or pattern. The noise generator 140 has a pair of outputs 143 and 144, the output 143 connected to the input of an encoder 150 and the output 144 connected to the input of a decoder 160 for supplying the noise signal to both the encoder 150 and the decoder 160. The noise signal supplied to the decoder 160 is, however, slightly delayed for reasons discussed below. The encoder and decoder may use any of the various known signal encoding and decoding methods, e.g. frequency modulation and demodulation, amplitude modulation and demodulation, pulse modulation and demodulation or, signal addition and subtraction. The encoders and decoders used in the preferred implementation are adders and subtractors respectively.

Encoder 150 has an additional input connected to a system interface 190, shown in phantom outline in FIG. 1, through which the system exchanges information with a user. By way of example, interface 190 may include a microphone 191 built into the handset 10. The output of encoder 150 is connected to a second input of transmitter 170 to supply thereto a composite signal comprising not only the message signal received from the system interface 190, but also the predetermined noise signal supplied from output 143 of the noise generator 140.

A second decoder input is connected to a receiver 180. The term receiver, as used herein, includes all the apparatus and steps necessary to collect the transmitted electromagnetic energy and thereafter convert it to an electrical message signal. In the preferred implementation of the present invention, receiver 180 comprises a frequency modulation receiver adapted to receive signals at a frequency of 1.7 MHz. The signal supplied to the decoder 160 by the receiver 180 is a composite signal comprising a received message signal and a noise signal generated by the base station 20 that is normally identical to and synchronized with the delayed noise signal generated by the noise generator 140 and supplied from output 144. It will be understood that the receiver may embody any one of the well known methods for collecting and converting electromagnetic energy to an electrical message signal, the only limitation being that the method chosen for transmission must be compatible with that used for reception.

While the encoder 150 adds the noise signal generated by the noise generator 140 to the message signal from the system interface 190 to produce a composite, or encoded, signal, the decoder 160 subtracts from the composite signal received from the receiver 180 the delayed noise signal generated by the noise generator 140. If the noise signals supplied from output 144 of the noise generator 140 and the noise signal included in the composite signal received from the receiver 180 are identical, only the decoded message signal remains at the outputs of the decoder 160. In such a case, the noise signals are synchronized and thus cancel each other in the decoder 160. If, however, the noise signals are not synchronized for any reason, they will not cancel out in the decoder 160, and the signal supplied to the outputs of the decoder 160 will include a noise signal component.

One output of decoder 160 is connected to the system interface 190 by means of which a system user may receive information from the communication system, e.g. through a speaker 195 built into handset 10. A second decoder output is connected to a detector 120, the output of which is in turn connected to the disabler 110. In the preferred implementation, detector 120 is responsive to the presence of a noise signal component in the decoder output signal to cause the disabler 110 to prevent the delivery of the pilot signal from the oscillator 100 to the tranmitter 170 and the synchronizing circuit 130. Detector 120 may use any method by which the presence of a noise signal after decoding is indicated. In this manner, lack of synchronization of the delayed noise signal from the noise generator 140 with the noise signal received from the base station 20 will prevent delivery of the pilot signal to the transmitter 170 and the synchronizing circuit 130.

Base station 20 includes a receiver 280 which is adapted to receive an encoded message signal from the handset 10 at a frequency of 49 MHz in a preferred implementation of the invention. The output of receiver 280 is connected to a filter 210 and a filter 220. In a preferred embodiment, filter 210 is a band pass filter which recovers the pilot signal and attenuates the encoded message signal. Conversely, filter 220 functions as a band pass filter to recover the noise encoded message signal and attenuate the pilot signal. The output of filter 220 is connected to one input of a decoder 260.

Decoder 260 is connected to the input of a system interface 200. The illustrated interface 200 permits a remote user to communicate with the system through a pair of telephone lines 201 and 202 by receiving or sending information. Alternatively, the interface 200 may include a microphone and speaker as the interface 190 of the handset 10. In an alternative arrangement, filter 220 may be omitted and a pass filter 220A, shown in phantom outline in FIG. 1 and having the same characteristics as filter 220, may be connected in lieu thereof between the output of decoder 260 and system interface 200.

Filter 210 is connected to the input of a synchronization circuit 230 which has a pair of outputs, each connected to a noise generator 240. The output of noise generator 240 has a single output 243, which is connected to both a second input of decoder 260 and a first input of an encoder 250. A second input of encoder 250 is connected to system interface 200. The output of encoder 250 is connected to a transmitter 270, which is adapted to transmit message signals at a frequency of 1.7 MHz in a preferred implementation of the invention. The functions of the encoder 250 and the decoder 260 are substantially identical to those of the encoder 150 and the decoder 160.

The pilot signal generated by the oscillator 100 is directly coupled to the synchronization circuit 130 and indirectly coupled to the synchronization circuit 230 by the transmitter 170 and the receiver 280 as well as the physical space over which the pilot signal must be transmitted. As a result, the synchronization circuit 230 receives the pilot signal at a slightly later time than the synchronization circuit 130. Thus, if the noise generators 140 and 240 generate identical noise signals upon receipt of reset signals from their respective synchronization circuits 130 and 230, the noise signal generated by the noise generator 240 at the output 243 will be delayed slightly with respect to the noise signal generated by the noise generator 140 at its output 143. Similarly, it takes a very small period of time for the encoded signal leaving the encoder 250 to reach the decoder 160. To accommodiate these inherent delays, the noise signal supplied to the decoder 160 from output 144 of the noise generator 140 is identical to the noise signal at output 143, but is delayed an amount sufficient to be substantially in phase with the noise signal component supplied to the decoder 160 from the receiver 180. In a practical example of the invention, the noise signal at output 144 is delayed by two cycles of the 6 KHz pilot signal, or approximately 333 microseconds.

Synchronization circuits 130 and 230 are substantially identical in the preferred embodiment of the invention. Similarly noise generators 140 and 240 are substantially identical except for the delay output 144 of generator 140. These circuits are illustrated in greater detail in FIGS. 2 and 4, where they are referenced as synchronization circuit 130 and noise generator 140 respectively.

Figure 2:
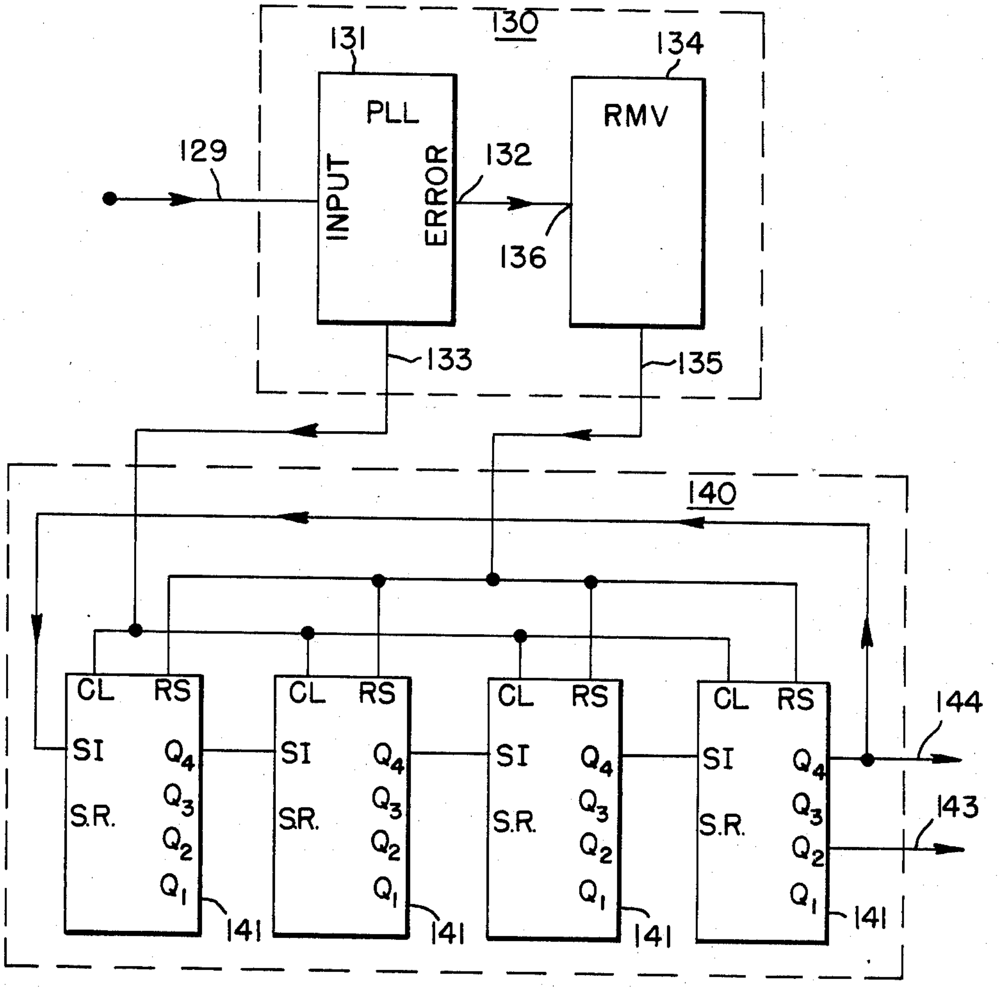
FIG. 2 is a detailed block diagram of portions of the apparatus of FIG. 1.

Referring now to FIG. 2, synchronization circuit 130 comprises a frequency recovery circuit 131 and a pulse generating circuit 134. In the preferred implementation of the invention, circuit 131 comprises a phase locked loop (PLL), including an input 129 to which the pilot signal is supplied, a first output 133 which is designated voltage controlled oscillator (VCO) output in the drawing, and a second output which is designated error output 132. A comparable integrated circuit is commercially available from Radio Corporation of America as a 4046 dual in line PLL. However, it will be understood that circuit 131 may comprise any frequency recovery circuit adapted to provide output signals of the type hereinafter described.

The error output of PLL 131 is connected to a pulse generating circuit 134, which may be a retriggerable monostable multivibrator (RMV) of the type commercially available from National Semiconductor as 74LS123 dual in line retriggerable monostable multivibrator. It will be understood that circuit 134 may comprise any pulse generating circuit adapted to generate a reset pulse at its output 135 upon detection at its input 136 of a specific condition as hereinafter described.

Figure 3:
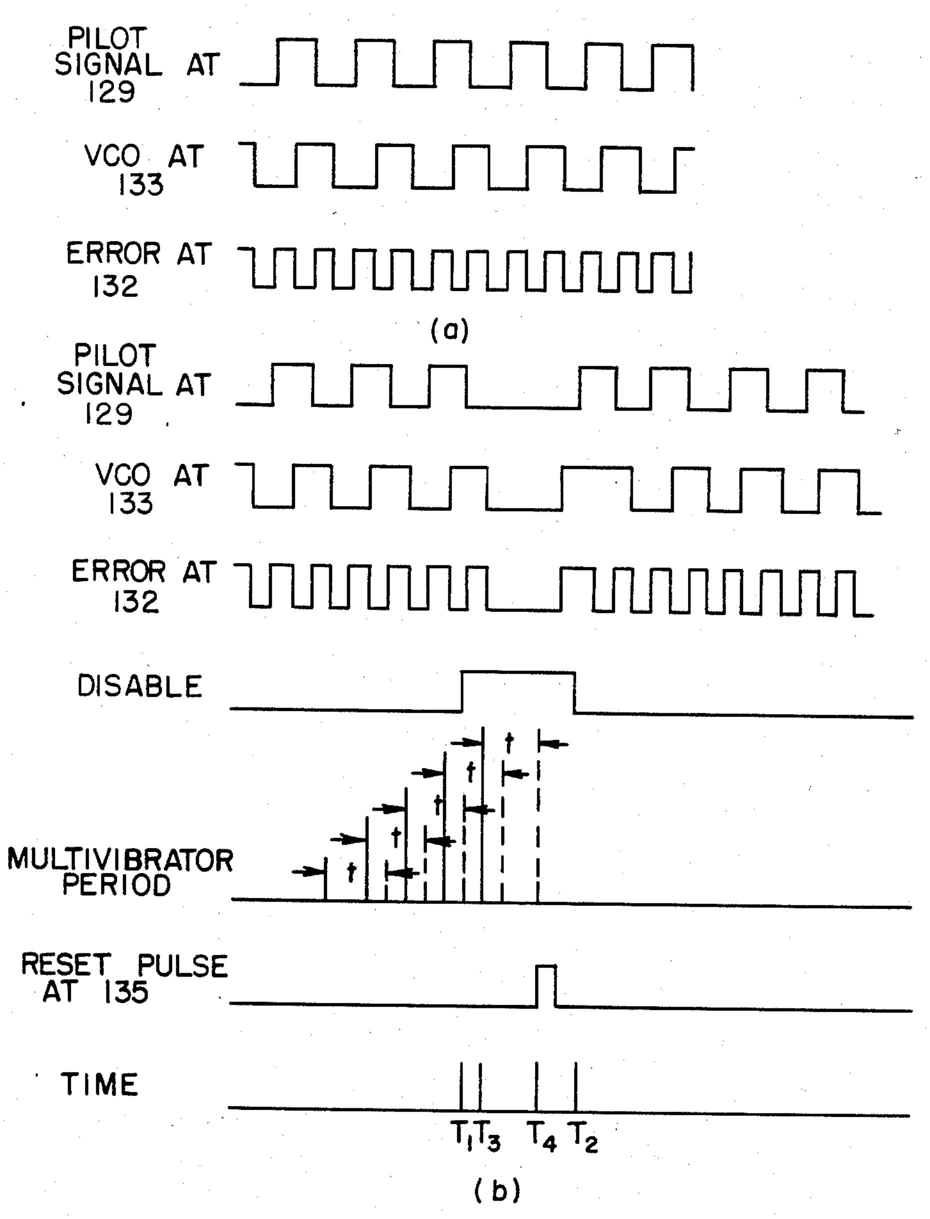
FIGS. 3(a) and 3(b) illustrate relevant pulse signals of the apparatus of FIGS. 1 and 2.

The operation of the synchronization circuit 130 will now be described with reference to FIGS. 2 and 3. When a pilot signal is continuously present at PLL input 129 as illustratèd by FIG. 3(a), the PLL 131 provides a signal at its VCO output 133 at the same frequency as the pilot signal at input 129, but at a constant 90 degree phase shift therefrom. A network within the PLL 131 provides the error signal at output 132 through an exclusive OR combination of the pilot signal at 129 and the VCO signal at 133. The resulting error signal has a frequency twice that of the pilot signal. In FIG. 3(b), operation prior to time $T_1$ is identical to that of FIG. 3(a). At time $T_1$, the disabler 110 (FIG. 1) becomes operative to prevent further passage of the pilot signal to the synchronization circuit 130. Thereafter, in the absence of a pilot signal at input 129, the PLL 131 generates a signal at the VCO output 133 at a lower fixed frequency, say one-half of that of the pilot signal. Since after time $T_1$ there is no pilot signal, the exclusive-OR network produces an error signal at output 132 that is in phase with the VCO output signal. If the disabler 110 again becomes inoperative at time $T_2$, the pilot signal will again be supplied at input 129, and output signals will again be generated at outputs 133 and 132 as they were prior to time T.

Retriggerable monostable multivibrator 134 has an input 136 coupled to the output 132 of PLL 131 for receiving therefrom the error signal. Under certain conditions, the retriggerable monostable multivibrator 134 generates a reset pulse at its output 135. More particularly, the mulitvibrator 134 has a fixed multivibrator period "t" that is initiated by the receipt at its input 136 of a negative going edge of an input pulse at 132. If another negative going edge is received at the input 136 during the multivibrator period, the multivibrator 134 is retriggered, and a new multivibrator period is initiated as illustrated by FIG. 3(b). Under these conditions, a reset pulse will not be generated by the multivibrator 134 at its output 135. If, however, another negative going edge is not received at the input during the mulitvibrator period, as between times $T_3$ and $T_4$, the multivibrator is not retriggered, and a reset pulse is generated by the multivibrator 134 at its output 135 at the end of the multivibrator period, e.g. immediately following time $T_4$. It will be understood by those skilled in the art that an equivalent circuit with these characteristics may be substituted without departing from the invention herein. Further, while the preferred circuit reacts to the negative edge of a pulse at its input, the circuit may be chose to react to either edge.

Figure 4:
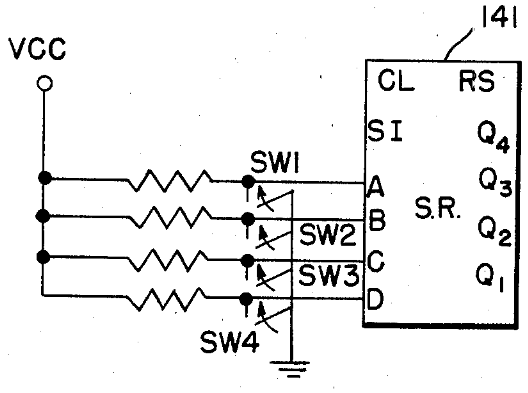
FIG. 4 illustrates further details of portions of the apparatus shown in FIG. 2.

Noise generator circuit 140 is shown to comprise a plurality of shift registers 141 of the type commercially available from National Semiconductor as 74C194 dual in line shift register. Registers 141 are serially connected in a closed loop, with the output 144 of the noise generator taken at the output of any one of the shift registers, e.g., the rightmost shift register as illustrated in FIG. 2. The clock inputs CL of the respective shift registers are each connected to PLL output 133, and the reset inputs RS of the shift registers are each connected to the output 135 of monostable multivibrator 134. As shown in FIG. 4, each shift register is provided with a plurality of switches, SW1–SW4, adapted to be preset to a selected initial state. In accordance with the present invention, the initial state is set identically for the noise generators 140 and 240 of all associated transceivers 10 and 20. The output 144 of the noise generator 140 is coupled to the $Q_4$ output of the rightmost shift register 141, and the output 143 is coupled to the $Q_2$ output of the same shift register 141. The output at 144 is thus identical to the output 143, but delayed relative thereto by two clock pulses. The noise generator 240 is identical to the noise generator 140 except that the single output of the noise generator 240 is coupled to both the encoder 250 and the decoder 260.

In operation, a first system user may deliver information to a transceiver interface. This may occur by way of telephone line 201 in the case of interface 200, or by way of microphone 191 in the case of interface 190. In either case, the information is converted to an electrical message signal by the interface, and is thereafter added to the noise signal in the encoder which encodes the message signal. Upon reaching the respective transmitter, e.g. circuit 170, the encoded message signal is transmitted to the other transceiver unit, e.g. unit 20, where an identical noise signal is subtracted from the encoded message signal in decoder 260. The decoded message signal is subsequently converted to information by the interface, e.g. to a telephone signal in interface 200, or to an audible signal in speaker 195, and is delivered in that form to a second system user.

Referring now to FIGS. 1–3, each noise generator of the system is synchronized by locally generated clock pulses at the VCO output 133 of the PLL 131, which are derived from the pilot signal as described above, i.e., at the same frequency. Oscillator 100 generates the pilot signal, which is applied to the synchronization circuit 130 and the transmitter 170 via disabler 110. The pilot signal is transmitted to base station 20 together with the transmitted message signal, where it is received by receiver 280 and applied to synchronization circuit 230 via band pass filter 210. Thus, the pilot signal is applied to each of synchronization circuits 130 and 230, each of which responds by generating clock pulses which synchronize the operation of the corresponding noise generators 140 and 240.

When the noise generators of handset 10 and base station 20 operate in synchronism, in the manner taught herein, noise added in either transceiver unit by that unit's encoder is substantially completely subtracted in the other unit by the latter's decoder. If the noise generators are not in synchronism with each other, the noise signal added to the message signal by base station encoder 250 is not completely subtracted by decoder 160 of handset 10. Thus, detectable noise will appear at the output of decoder 160, which will activate detector 120.

When activated, the detector 120 causes disabler 110 to disable the pilot signal such as at time $T_1$ in FIG. 3(b). In response to the loss of the pilot signal, synchronization circuits 130 and 230 each generate at the output 135 reset pulses which reset their respective noise generators 140 and 240 to the aforementioned pre-selected initial state. With synchronization of the noise generators thus re-established, decoder 160 will again completely subtract the noise added by encoder 250 to the message signal. Hence, noise detector 120 is inactivated and the pilot signal is again enabled.

It should be noted that proper operation of synchronization circuit 130 or 230, which are shown in greater detail in FIG. 2 as circuit 130, requires that the monostable multivibrator period, the VCO free running frequency, and the frequency of the pilot signal be carefully chosen. Specifically, the desired operation is obtained when the monostable multivibrator period "t" is greater than the period of the error signal at output 132 when a pilot signal is present at input 129, but less than the period of the error signal when a pilot signal is not present at input 129.

Thus, while the pilot signal is enabled, clock pulses with the same frequency as that of the pilot signal are generated at PLL VCO output 133. Because the period "t" of the error signal at 132 (in the presence of a pilot signal) is chosen to be less than the monostable multivibrator period, the monostable multivibrator continues to retrigger on each negative edge of the error signal, and therefore a reset signal is not generated at output 135. When, however, noise is detected and the disabler 120 prevents the further delivery of the pilot signal, the period of the error signal increases to an extent that a reset signal is generated to reset the noise generator. This is accomplished locally in both transceivers 10 and 20, and both noise generators 140 and 240 are substantially simultaneously (subject to inherent transmission delays as described heretofore) reset to their predetermined and identical initial states.

Thus, the invention illustrated and described herein provides a system with the requisite reliability for commercial applications. In addition to providing clock pulses to the corresponding noise generator, each synchronization circuit is used to generate local resynchronization pulses in the corresponding transceiver unit. Further, a resynchronization pulse can be generated at any time, such that compensation can be made for drift occurring either during signal transmission or during signal reception.

While the present invention has been described in relation to a wireless telephone system comprising at least one handset and a base station, it will be clear to workers in the art that the invention will find application in other wireless communication devices wherein synchronization is desired. Further, although the present invention has been discussed in relation to a secure communication system wherein a message signal is coded and decoded by the addition and subtraction respectively, of synchronous noise signals, the synchronization system herein described will also find application in a secure communication system wherein the message signal is modulated or otherwise coded with a synchronous noise signal.

What is claimed is:

1. A wireless communication system for the secure transmission of information between system users, said system comprising at least first and second transceiver units;

each of said units including:

a system interface comprising means for providing a message signal in response to information received from a system user;

a synchronization circuit;

a noise generator responsive to said synchronization circuit for generating a predetermined noise signal;

means for encoding said message signal with said noise signal;

means for transmitting said encoded message signal to another unit of said system means for receiving the encoded message signal transmitted by another unit of said system;

means for decoding said received encoded message signal with said noise signal; and means in said interface for providing information to a system user in response to said decoded message signal;

said first unit further including:

means for generating a fixed frequency pilot signal, means for applying said pilot signal to the input of the synchronization circuit of said first unit;

means for applying said pilot signal to said transmitting means for joint transmission with said encoded message signal;

means responsive to said decoding means for detecting an unsynchronized condition between the noise signals generated in respective ones of said units; and means responsive to said detecting means for disabling said pilot signal upon the occurrence of said unsynchronized condition;

said second unit further including;

first filter means connected between said receiving means and the input of the synchronization circuit of said second unit, said first filter means being adapted to pass substantially only said pilot signal to said last-recited synchronization circuit; and second filter means connected in series with said decoding means between said receiving means and said interface, said second filter means being adapted to substantially block said pilot signal; and each of said synchronization circuits being responsive to the presence and absence of said pilot signal to provide clock pulses or reset pulses respectively to the corresponding noise generator, said reset pulses being adapted to reset all of said noise generators substantially simultaneously to the same initial state.

2. A communication system as recited in claim 1 wherein said means for providing a message signal in response to received information comprises a microphone and a telephone line in said first and second unit interfaces respectively, and said means for providing information in response to said decoded message signal comprises a speaker and a further telephone line in said first and second unit interfaces respectively, said telephone lines being adapted to connect a remote user to said system.

3. A communication system as recited in claim 1 wherein each of said noise generators comprises a plurality of shift registers serially connected to form a closed loop, means for deriving said noise signals from corresponding shift registers of respective loops;

each of said shift registers including;

a clock input connected to receive said clock pulses;

a reset input connected to receive said reset pulses; and means responsive to said reset pulses for parallel loading a presettable initial state into said shift registers.

4. A communication system as recited by claim 1 wherein said noise generator of said first unit supplies said noise signal to said encoding means at a first time and to said decoding means at a second time delayed with respect to said first time, the delay period being selected to provide allowance for transmission delays between said first and second unit.

5. A communication system as recited in claim 1 wherein each of said synchronization circuits comprises;

a frequency recovery circuit responsive to said pilot signal to provide said clock pulses at the frequency of said pilot signal, said frequency recovery circuit being further adapted to provide clock pulses in the absence of said pilot signal at a frequency lower than said pilot signal frequency; and a pulse generating circuit responsive to said frequency recovery circuit for providing said reset pulses in response to the absence of said pilot signal.

6. A communication system as recited in claim 5 wherein said frequency recovery circuit comprises;

a phase locked loop including an input and first and second outputs, said phase locked loop input being connected to receive said pilot signal, said first output being adapted to provide a signal at the frequency of said pilot signal in the presence of said pilot signal and at a substantially lower frequency in the absence of said pilot signals, and said second output being adapted to provide a further signal at a relatively high fixed frequency in the presence of said pilot signal and being further adapted to provide a relatively low fixed frequency signal in the absence of said pilot signal.

7. A communication system as recited in claim 6 wherein said pulse generating circuit comprises:

a retriggerable monostable multivibrator having an input and an output, said last-recited input being connected to said second output of said phone locked loop, said monostable multivibrator being adapted to retrigger when the signal at said second output is at said relatively high frequency, and being further adapted to generate said reset pulses when said second output signal is at said relatively low frequency.

* * * * *